United States Patent
Ryan et al.

(10) Patent No.: US 7,053,509 B2
(45) Date of Patent: May 30, 2006

(54) QUENCH MONITORING AND CONTROL SYSTEM AND METHOD OF OPERATING SAME

(75) Inventors: David Thomas Ryan, Niskayuna, NY (US); Evangelos Trifon Laskaris, Schenectady, NY (US); Xianrui Huang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 54 days.

(21) Appl. No.: 10/813,281

(22) Filed: Mar. 30, 2004

(65) Prior Publication Data

US 2005/0218731 A1 Oct. 6, 2005

(51) Int. Cl.
*H02K 7/10* (2006.01)
*H02P 15/00* (2006.01)

(52) U.S. Cl. .................... 310/68 C; 310/64
(58) Field of Classification Search ........... 310/68 C, 310/68 A, 254, 68 B, 52–64
See application file for complete search history.

(56) References Cited

U.S. PATENT DOCUMENTS

| 5,047,741 A | 9/1991 | Laskaris | 335/216 |
| 5,548,168 A | 8/1996 | Laskaris et al. | 310/52 |
| 6,420,842 B1 | 7/2002 | Gold | 318/141 |
| 6,642,682 B1 * | 11/2003 | Perkins et al. | 318/436 |
| 6,828,919 B1 * | 12/2004 | Gold | 340/870.29 |

* cited by examiner

*Primary Examiner*—Tran Nguyen
(74) *Attorney, Agent, or Firm*—Fletcher Yoder

(57) ABSTRACT

A rotating machine comprising a superconductive coil and a temperature sensor operable to provide a signal representative of superconductive coil temperature. The rotating machine may comprise a control system communicatively coupled to the temperature sensor. The control system may be operable to reduce electric current in the superconductive coil when a signal representative of a defined superconducting coil temperature is received from the temperature sensor.

28 Claims, 3 Drawing Sheets

QUENCH MONITORING AND CONTROL SYSTEM AND METHOD OF OPERATING SAME

This invention was made with Government support under contract number DE-FC36-02G011100 awarded by the U.S. Department of Energy. The Government has certain rights in the invention.

BACKGROUND

The invention relates generally to a rotating electrical machine having a superconductive coil, and in particular to a system and method for quench monitoring and control of a superconductive rotor coil of a rotating electrical machine.

A superconductor is a material that will conduct electricity with no electrical resistance. Most electrical conductors have some electrical resistance. However, electrical resistance is an undesirable property for a conductor to have because the electrical resistance consumes energy as heat. Superconductivity occurs in certain materials when the material is cooled below a critical temperature.

The rotors of rotating electrical machines typically use an electrical current flowing through a coil to produce a magnetic field. In commercial power generation systems, the amount of electrical current that flows through the rotor coil may be significant. However, a portion of the electrical current is consumed as resistive heating, reducing the efficiency of the power generation system. Consequently, superconductive rotor coils have been developed for use in rotating electric machines. At ambient temperatures, the coil has a defined electrical resistance. However, when cooled below the critical temperature, the coil enters a superconducting state and loses its electrical resistance.

If the current flowing through a superconductive rotor coil is driven beyond a critical current limit, a portion of the superconductive rotor coil may change from the superconducting state to a normal resistive state. The portion of the coil in the normal resistive state will cause resistive heating to occur in the superconductive rotor coil. If the resistive heating of the coil continues, the coil may enter a state of irreversible thermal runaway, known as a quench. A sustained high current density in the coil may lead to intense local heating, causing a rapid temperature rise in the region of the coil experiencing the quench. As a result, a sufficient temperature gradient may be generated in the rotor coil to cause differential expansion to occur that may, in turn, lead to strain related damage in the coil. Quenching may occur in a superconductive rotor coil for reasons other than the coil current exceeding the critical current. Other potential causes of quenching in the superconductive coil may include a loss of cooling, a failure of the thermal insulation around the coil, bad joints at current lead junctions, and the degradation over time of the superconducting properties of the coil.

Typically, quenching in a superconductive rotor coil is detected by measuring the voltage developed across the rotor coil. However, this method of detecting quenching is problematic in generators because large inductive voltages are generated across the coil during normal operation of the generator, thus making it difficult to determine when quenching is actually occurring in the coil.

Accordingly, a technique that enables quenching to be detected in a superconductive rotor coil without using the voltage across the coil as the indicator of quenching is desirable. In addition, a technique that enables the superconductive coil to be protected from damage caused by quenching is also desirable.

BRIEF DESCRIPTION

In accordance with one aspect of the present technique, a rotating machine comprising a superconductive rotor coil and a temperature sensor operable to provide a signal representative of superconductive rotor coil temperature is provided. The rotating machine may comprise a control system communicatively coupled to the temperature sensor. The control system may be operable to reduce electric current in the superconductive rotor coil when a signal representative of a defined superconducting coil temperature is received from the temperature sensor.

In accordance with another aspect of the present technique, a method of operating a rotating electric machine is provided. The method may comprise transmitting a signal representative of superconductive rotor coil temperature from a temperature sensor to a control system. The method may also comprise activating a circuit to remove electrical current in the superconductive rotor coil when a defined superconducting coil temperature is detected.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
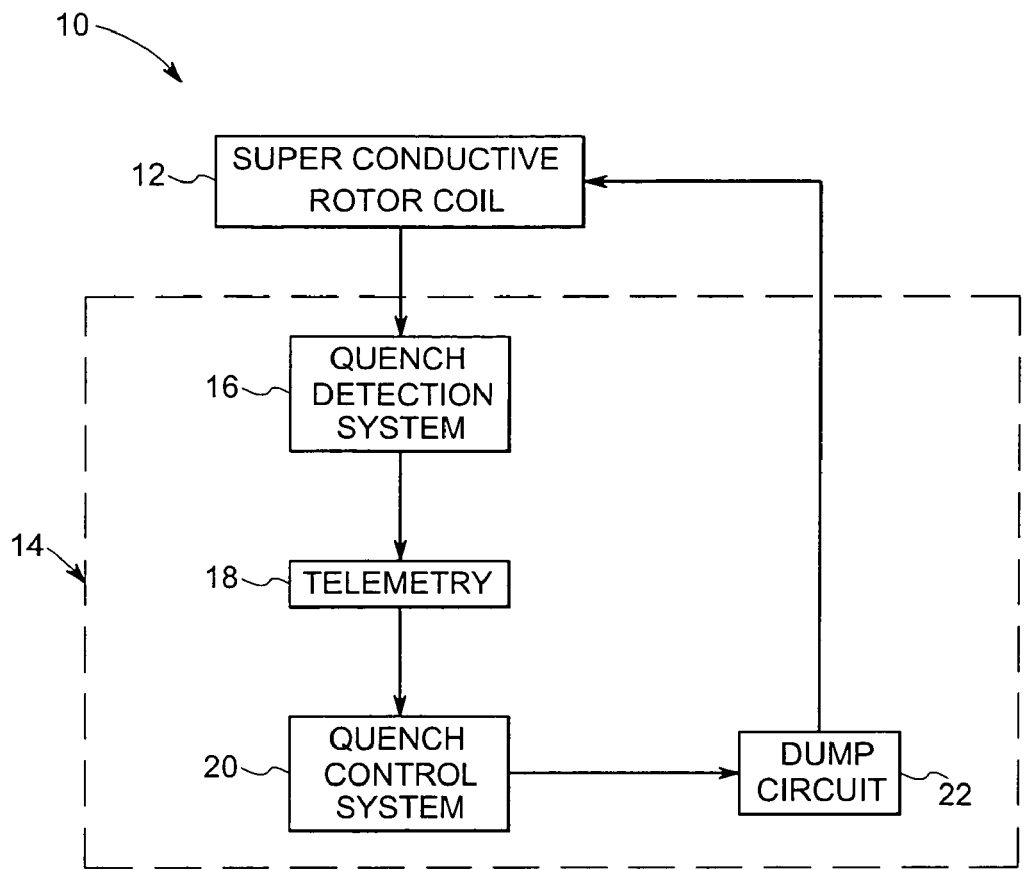
FIG. 1 is a diagrammatical view of a rotating electrical machine having a superconductive rotor coil.

Referring now to FIG. 1, a power generation system, represented generally by reference numeral 10, is illustrated. However, the techniques described below are applicable to motors, as well as generators. The power generation system 10 has a superconductive rotor coil 12. A quench monitoring and control system 14 is provided to protect the superconductive rotor coil 12 from damage due to a quench condition. The quench monitoring and control system 14 is operable to detect when a quench condition exists in the rotor coil 12 and to act to protect the rotor coil 12 from damage that may be caused by the quench condition. In the illustrated embodiment, the quench monitoring and control system 14 comprises a quench detection system 16, telemetry 18, a quench control system 20, and a dump circuit 22. The quench detection system is operable to transmit a signal representative of the temperature of the rotor coil 12 to the quench control system 20 via the telemetry 18. Upon receipt of the signal, the quench control system 20 determines if a quench condition exists and, if so, removes power to the coil 12. In addition, the quench control system 20 discharges the magnetic field stored in the coil 12.

Figure 2:
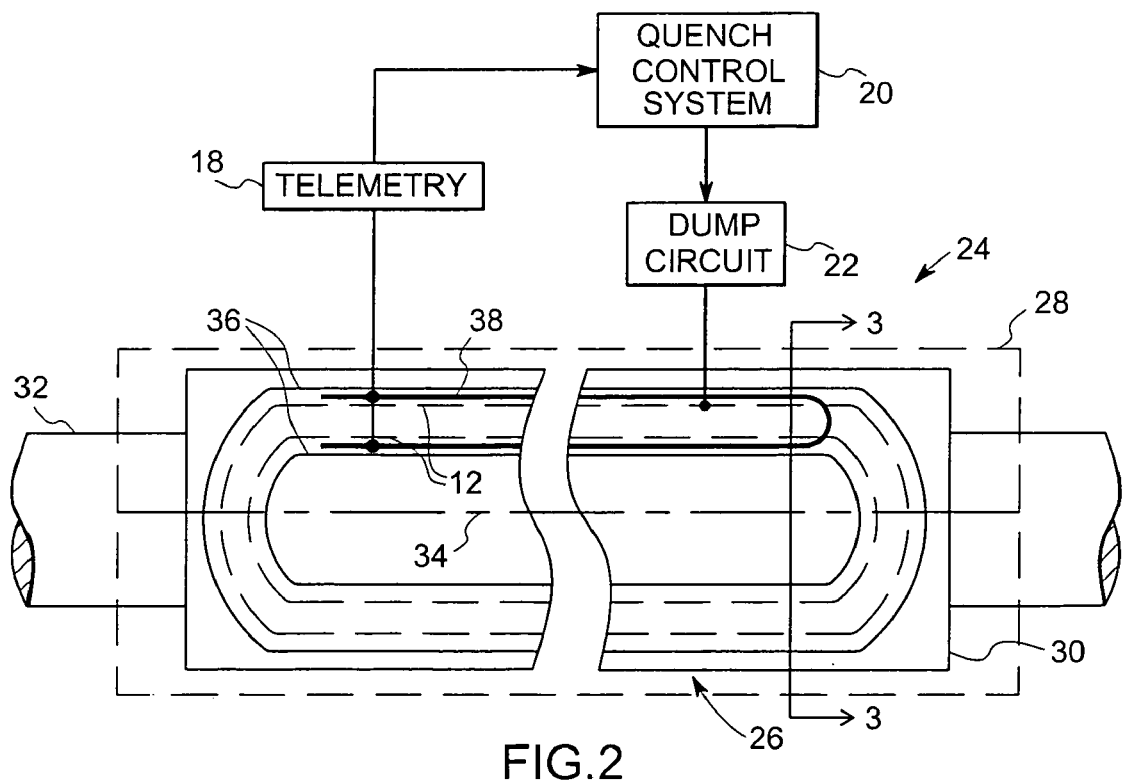
FIG. 2 is a detailed view of the rotating electrical machine of FIG. 1.

Referring generally to FIG. 2, a detailed view of the rotating electrical machine 10 of FIG. 1 is illustrated. In the illustrated embodiment, the rotating electrical machine 10 comprises a generator 24 having a rotor 26 and a stator 28. The rotor 26 comprises the superconductive rotor coil 12 and a rotor core 30. The superconductive rotor coil 12 is wound on the rotor core 30. In addition, the rotor core 30 has end shaft 32 that enable the rotor core 30 to rotate about a longitudinal axis 34 through the stator 28. The solid core 30 of the rotor 26 is made of ferromagnetic material having a high magnetic permeability. A thermal shield 36 is disposed around the superconductive coil 12, which is disposed circumferentially around the solid core 30 of the rotor 26. The thermal shield 36 is generally spaced apart from the superconductive coil 12 and the solid core 30.

The quench detection system 16 comprises a temperature sensor 38 that is operable to produce a signal representative of the temperature of the superconductive coil 12. In addition, the quench detection system 16 is operable to transmit the signal representative of rotor coil temperature to the quench control system 20 via telemetry 18. The temperature sensor 38 is explained in more detail with reference to FIG. 4 below.

The quench control system 20 is operable to receive the signal representative of the superconductive rotor coil 12 temperature from the telemetry 18 and to act to protect the coil 12 when a quench condition is detected. The quench control system 20 is coupled to the dump circuit 22. When activated by the quench control system 20, the dump circuit 22 removes power from the coil 12 and connects a resistor in series with the coil 12 to discharge the magnetic field stored in the coil 12. The quench control system 20 is configured to activate the dump circuit 22 when the temperature of the superconductive rotor coil 12 rises to a defined temperature limit. As described above, when a quench condition exists in the superconductive rotor coil 12, a portion of the superconductive coil 12 loses its superconducting properties and its electrical resistance begins to rise, causing the temperature of the coil 12 to rise. This rise in temperature is detected by the temperature sensor 38. The temperature limit is set at a temperature above the normal operating temperature of the superconductive rotor coil 12, but low enough to trigger the quench control system 20 to act before the coil 12 is damaged.

Figure 3:
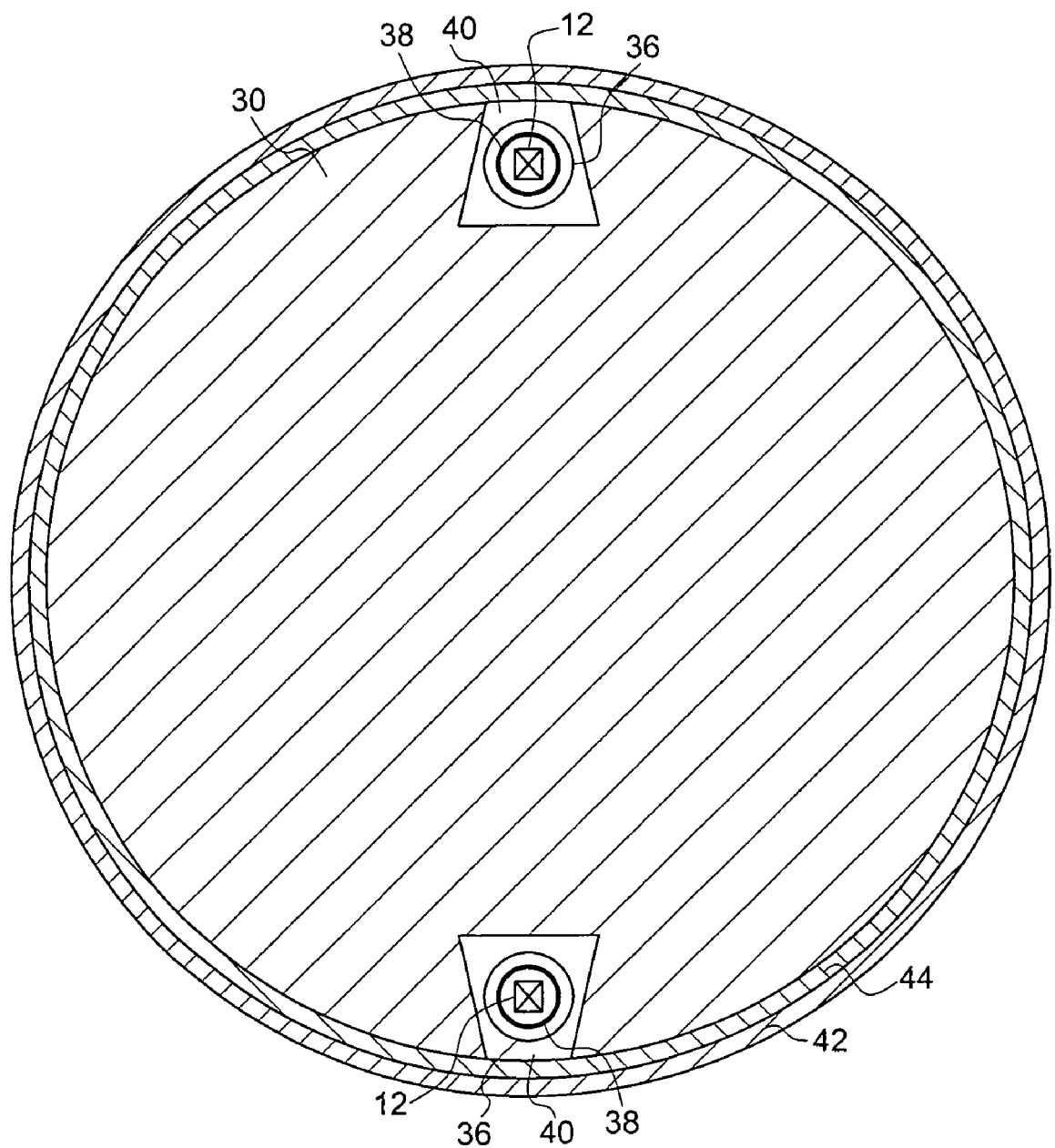
FIG. 3 is a cross-sectional view of the rotor of the rotating electrical machine, taken generally along line 3—3 of FIG. 2.

Referring generally to FIG. 3, a cross-sectional view of the rotor 26 of FIG. 2 is illustrated. The superconductive rotor coil 12 is disposed within slots 40 formed in the rotor core 30. In the illustrated embodiment, the rotor 26 also comprises an electromagnetic shield 42 disposed around the rotor core 30. A vacuum envelope 44 extends around the rotor core 30 between the electromagnetic shield 42 and the rotor core 30.

Figure 4:
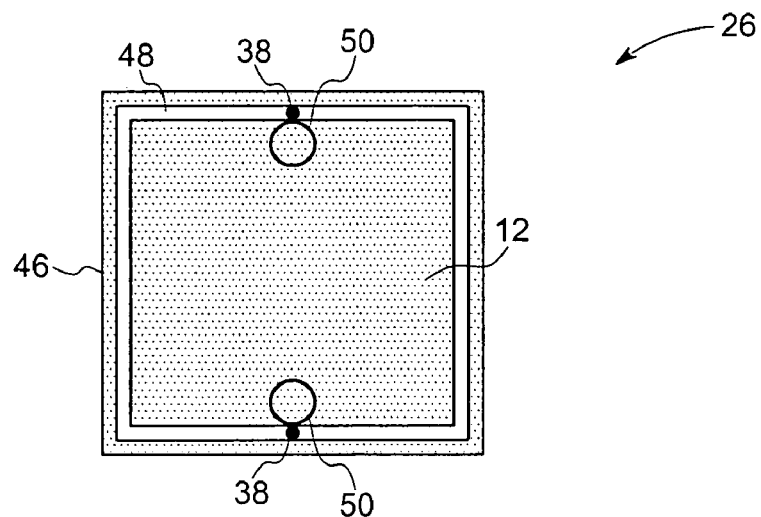
FIG. 4 is a detailed view of the rotor of FIG. 3, illustrating a quench detection and protection system.

Referring generally to FIG. 4, a detailed view of the rotor 26 is illustrated. In addition to the temperature sensor 38, the quench detection system 16 comprises a thermally conductive copper sheet 46 formed around the superconductive rotor coil 12 and an insulation layer 48 disposed between the copper sheet 46 and the coil 12. The copper sheet 46 disseminates heat generated by the superconductive coil 12 when the coil 12 is driven into a resistive state, thereby reducing the temperature. This reduction in temperature increases the over-current capacity of the coil 12 and reduces the peak temperature in the event of a quench. However, the copper sheet 46 also serves to conduct heat to the temperature sensor 38. Thus, if quenching is occurring in a remote portion of the coil 12, the copper sheet 46 may couple the heat produced as a result of the quenching to the temperature sensor 38, thereby improving the ability of the temperature sensor 38 to detect quenching. Although a copper sheet is used in the illustrated embodiment, other thermally conductive materials may be used. The layer of insulation 48 in the illustrated embodiment is made of a G10 or similar material.

The temperature sensor 38 is disposed on the superconductive coil between the superconductive coil 12 and the copper sheet 46. In the illustrated embodiment, the temperature sensor 38 is a resistance temperature detector (RTD) wire embedded in the insulation layer 48. The electrical resistance of the temperature sensor 38 varies with the temperature of the superconductive rotor coil 12. Preferably, a platinum wire is used as the temperature sensor 38 because of its resistivity at the critical temperature of the superconductive rotor coil. However, wire of a different material may be used as the temperature sensor 38. Other types of temperature feedback devices may be used, such as a thermocouple. In this embodiment, the temperature sensor 38 is mounted in a bifilar configuration to minimize the effect of voltages induced in the temperature sensor 38.

To facilitate the detection of quenching, the wire sensor 38 is disposed along the superconductive rotor coil 12 adjacent to the expected regions 50 of the lowest critical current in the coil 12. As noted above, the critical current is the current beyond which the superconductive coil 12 undergoes a transition from a superconducting state to a normal resistive state. The region of the coil 12 that has the lowest critical current 50 is the region that would be expected to quench first in the event of a quench. The critical current is a function of the magnetic field distribution of the superconductive coil 12, i.e., the critical current changes with respect to both the magnitude and the direction of the magnetic field. The region of the lowest critical current may be determined by first computing the magnetic field distribution as a function of the critical current along the entire coil. The data obtained from the magnetic field distribution is used to calculate the critical current at each point in the coil. Using this information, the region of the coil 12 with the lowest critical current may be determined.

Because the temperature sensor 38 extends along a substantial length of the superconductive coil 12, partial quenches that occur at locations along the length of the coil 12 may be detected by the temperature sensor 38. In addition, as noted above, the copper sheet 46 is operable to conduct heat to the temperature sensor 38 from hot spots located at a distance from the temperature sensor 48, thereby increasing the sensitivity of the temperature sensor 38.

Figure 5:
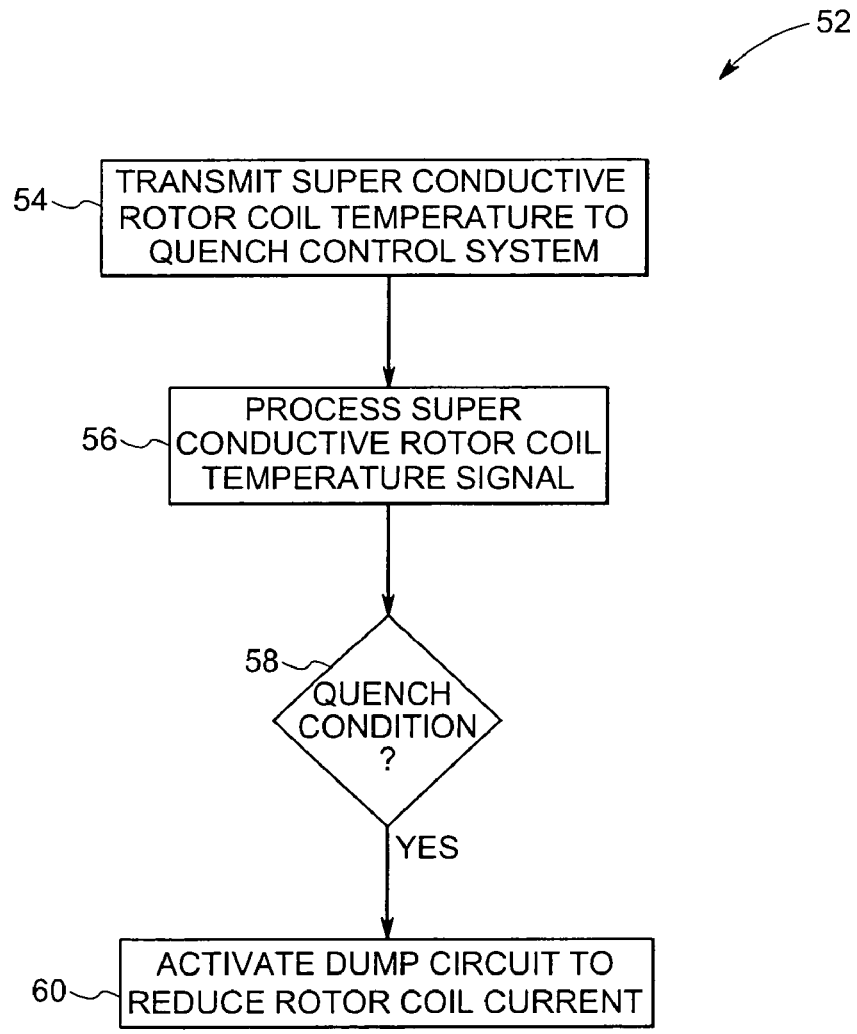
FIG. 5 is a flow chart illustrating a method of quench monitoring and control for the rotating electrical machine of FIG. 1.

Referring generally to FIG. 5, a method of monitoring and protecting a superconductive rotor coil from a quench condition is illustrated, and represented generally by reference numeral 52. The method 52 comprises providing a signal representative of superconductive coil temperature to a control system operable to control current to the superconductive coil, as represented by block 54.

The method may also comprise processing the signal representative of the temperature of the superconductive rotor coil 12 received from the temperature sensor 38, as represented by block 56. The quench control system 20 is operable to receive the signal representative of the temperature of the superconductive rotor coil 12 from the telemetry 18 and determine the temperature of the superconductive rotor coil 12. As noted above, the quench control system 20 may compensate for any magneto-resistance effects experienced by the temperature sensor 38 due to the magnetic field produced by the superconductive rotor coil 12.

The method also comprises determining if a quench condition exists based on the temperature of the superconductive rotor coil 12, as represented by block 58. If the temperature of the superconductive rotor coil 12 rises to the defined temperature, the quench control system 20 determines that quenching is occurring. If quenching is occurring, the quench control system 20 activates the dump circuit 22 to reduce the current flowing in the superconductive rotor coil 12, as represented by block 60. The dump circuit 22 removes power to the coil 12 and couples the coil 12 to a dump resistor in the dump circuit 22 to discharge the magnetic energy stored in the coil 12, further reducing the flow of current in the coil 12. With no current flowing through the coil 12, no resistive heating can occur in the coil 12. Thus, the superconductive coil 12 is protected from the harmful effects of quenching.

The techniques described above provide a system and method for protecting a superconductive rotor coil 12 from quenching by using the temperature of the superconductive rotor coil as the indicator of quenching. Using the temperature of the superconductive rotor coil 12 as the indicator of quenching removes the influence of large inductive voltages produced in the rotor 26 from the quench detection process. In addition, the techniques described above increase the ability of the superconductive rotor coil 12 to tolerate resistive heating during quenching by providing a path for heat to flow away from the superconductive coil 12 and into the thermally conductive sheet 46 disposed proximate to the soil 12, thereby reducing the effect of quenching.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A rotating machine, comprising:
a superconductive coil disposed within a rotor;
a thermally conductive sheet disposed around the superconductive coil; and
a temperature sensor disposed between the thermally conductive sheet and the superconductive coil and operable to provide a signal representative of superconductive coil temperature.

2. The rotating machine of claim 1, comprising a control system communicatively coupled to the temperature sensor and operable to reduce electric current in the superconductive coil when a signal representative of a defined superconductive coil temperature is received from the temperature sensor.

3. The rotating machine of claim 2, comprising a layer of insulation disposed between the thermally conductive sheet and the superconductive coil, wherein the temperature sensor is embedded in the layer of insulation.

4. The rotating machine of claim 2, wherein the temperature sensor transmits a signal representative of the temperature of the superconductive coil to the control system via telemetry.

5. The rotating machine of claim 2, comprising a resistor, wherein the control system couples the resistor in series with the superconductive coil to discharge the magnetic energy stored in the coil when the signal representative of a defined superconductive coil temperature is received from the temperature sensor detected.

6. The rotating machine of claim 2, wherein the control system is operable to compensate for magneto-resistive effects produced in the temperature sensor by the magnetic field produced by the superconductive coil.

7. The rotating machine of claim 1, wherein the temperature sensor is a resistance temperature detector.

8. The rotating machine of claim 7, wherein the resistance temperature detector comprises a wire disposed adjacent to an expected region of the lowest critical current in the superconductive coil.

9. The rotating machine of claim 8, wherein the resistance temperature detector wire is disposed in a bifilar configuration.

10. A quench monitoring and control system for a superconductive coil, the system comprising:
a thermally conductive sheet disposed around the superconductive coil;
a temperature sensor disposed between the thermally conductive sheet and the superconductive coil and operable to provide a signal representative of superconductive coil temperature; and
a control system coupled to the temperature sensor and operable to reduce electric current in the superconductive coil when a signal representative of a defined superconductive coil temperature is received from the temperature sensor.

11. The system of claim 10, wherein the superconductive coil is disposed within a rotor core.

12. The system of claim 10, wherein the thermally conductive sheet is operable to transmit heat produced in the superconductive coil at a remote location to the temperature sensor.

13. The system of claim 10, wherein the temperature sensor comprises a resistance temperature detector wire.

14. The system of claim 13, wherein the resistance temperature detector wire is disposed longitudinally along the superconductive coil adjacent to an expected region of lowest critical current in the superconductive coil.

15. The system of claim 10, wherein the temperature sensor transmits a signal representative of the temperature of the coil to the control system via radio telemetry.

16. The system of claim 10, wherein the control system activates a circuit to reduce the current in the superconductive coil when the signal representative of a defined temperature is received from the temperature sensor.

17. A method of operating a rotating machine having a superconductive coil, the method comprising:
providing a signal representative of superconductive coil temperature to a control system operable to control current to the superconductive coil; wherein the signal representative of superconductive coil temperature is provided by a temperature sensor located between a thermally conductive sheet and the superconductive coil; and
reducing current to the superconductive coil when a signal representative of a defined superconductive coil temperature is received.

18. The method of claim 17, wherein reducing current to the superconductive coil comprises activating a circuit to remove current flowing to the superconductive coil.

19. The method of claim 17, wherein reducing current to the superconductive coil comprises connecting the superconductive coil in series with a resistor to discharge the magnetic field stored in the superconductive coil.

20. The method of claim 17, wherein reducing current to the superconductive coil comprises comparing the signal representative of superconductive coil temperature with a reference signal indicative of a quench condition.

21. The method of claim 20, wherein reducing current to the superconductive coil comprises compensating for magneto resistance effects caused by the superconductive coil on the temperature sensor.

22. The method of claim 21, wherein compensating for magneto-resistance effects comprises establishing a magnetic field strength experienced by the sensor based on superconductive coil current and applying a correction to the signal representative of superconductive coil temperature based on the magnetic field strength.

23. A method of manufacturing a rotating machine the method comprising:
  disposing a superconductive coil inside a rotor;
  disposing a thermally conductive sheet around the superconductive coil; and
  disposing a temperature sensor between the thermally conductive sheet and the super-conductive coil to enable the temperature sensor to provide a signal representative of superconductive coil temperature.

24. The method of claim 23, comprising disposing a copper sheet around the superconductive coil proximate to the temperature sensor.

25. The method of claim 23, comprising coupling a control system to the temperature sensor, wherein the control system is operable to reduce electric current in the superconductive coil when a signal representative of a defined superconductive coil temperature is received from the temperature sensor.

26. The method of claim 23, comprising coupling the temperature sensor to telemetry operable to transmit the signal representative of superconductive coil temperature to the control system.

27. The method of claim 23, wherein the temperature sensor comprises a resistance temperature detector wire and disposing a temperature sensor proximate to the superconductive coil comprises disposing the resistance temperature detector wire longitudinally along the superconductive coil.

28. The method of claim 23, disposing the temperature senor proximate to the superconductive coil comprises disposing the temperature sensor adjacent to the expected region of lowest critical current in the superconductive coil.

* * * * *